UNITED STATES PATENT OFFICE.

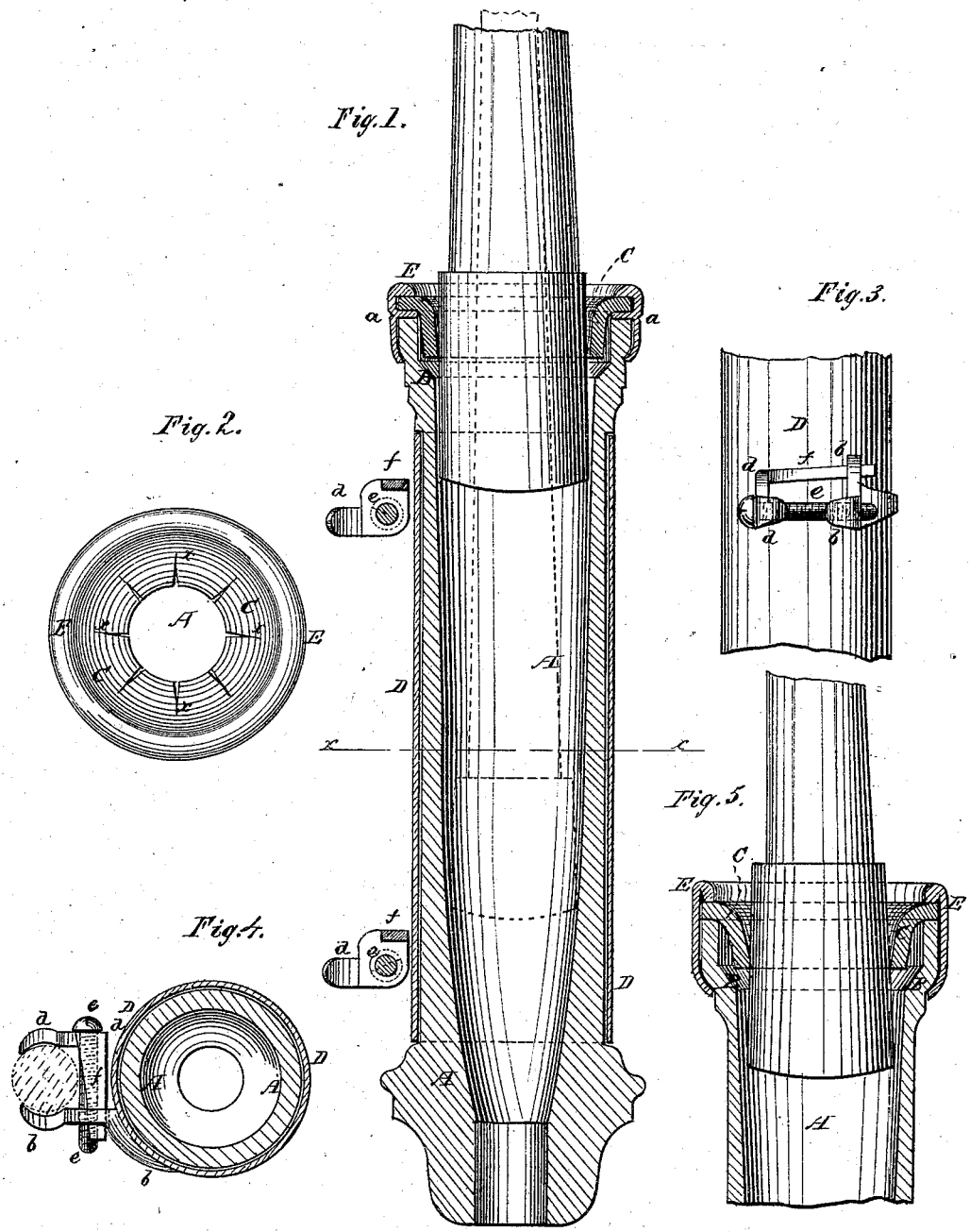

ANSON SEARLS, OF NEWARK, NEW JERSEY, ASSIGNOR TO HIMSELF, JOHN O. MERRIAM, AND EDWIN CHAMBERLIN, OF TROY, NEW YORK.

IMPROVEMENT IN WHIP-SOCKETS.

Specification forming part of Letters Patent No. 147,985, dated February 24, 1874; application filed September 6, 1873.

*To all whom it may concern:*

Be it known that I, ANSON SEARLS, of Newark, in the county of Essex and State of New Jersey, have invented certain new and useful Improvements in Whip Sockets and Fasteners; and I do hereby declare that the following is a full, clear, and exact description thereof, reference being had to the accompanying drawings and to the letters of reference marked thereon, which form a part of this specification.

The nature of my invention consists in the construction and arrangement of a whip-socket, as will be hereinafter more fully set forth.

In order to enable others skilled in the art to which my invention appertains to make and use the same, I will now proceed to describe its construction and operation, referring to the annexed drawing, in which—

Figure 1 is a horizontal section. Fig. 2 is a plan view of diaphragm C. Fig. 3 is a detail view of jaws $b$ and $d$; and Fig. 4 is a vertical section on line $x$ $x$, Fig. 1. Fig. 5 illustrates a modification of the top portion of my invention.

A represents a tubular whip-socket, made all or in part of wood or other suitable material, and provided with a bell-shaped or enlarged top, B, internally of a size and for a purpose hereinafter described. On top of the bell-top B is placed a rubber or elastic diaphragm, C. The size of the chamber or bell-top below the rubber C depends upon the thickness of the rubber and the depth of the chamber upon its diameter. As illustrated in the drawing, the socket A, internally, is about one and one-eighth inch in diameter, the chamber B about one and three-eighths, and about three-eighths inch deep. The rubber C is about one-eighth of an inch thick.

When the whip F is inserted, the rubber C is borne down on all sides, and out into the chamber B, until the whip passes freely down into the socket. Any whip that will go into the socket A will pass freely through the rubber.

It will be seen that if the rubber were made one-quarter of an inch thick, and the chamber B one and five-eighths in diameter, the chamber would have to be half an inch deep to allow the rubber room to turn down enough to admit the whip into the socket A; hence the chamber B forms room for the rubber C to turn into when the whip is inserted. The approximate size should be twice the thickness of the rubber larger than the barrel A, and in depth at least the depth of the rubber when turned down. In withdrawing the whip, the rubber turns up and expands freely in the same manner to let the whip out.

The rubber diaphragm used in this class of whip-sockets may be made in diameter equal to the external flange $a$, and about one-eighth or three-sixteenths of an inch thick. It can be made of any thickness, from one-eighth to one-half of an inch thick, its thickness only depending upon the diameter of the chamber B, for the larger the chamber the thicker the rubber may be made, until a thickness is arrived at sufficient to withstand any wear or injury it may be subjected to.

In the inner edge of the rubber C are slits $x$ $x$, that open when the whip is inserted, thereby reducing the strain on the rubber and whip when a very large whip is inserted. The slits should be about one-quarter of an inch deep in ordinary-sized rubbers, and a little deeper in heavy rubbers, but should not extend through.

The rubber C is held in its place on top of the chamber B by a cap, E. This cap should be made of sheet metal, and the top edge spun over and down, so as to rest on the rubber C, as shown at $h$, and form a rim or bead above the rubber. The bottom of the cap extends over the edge of the rubber C, and is spun down under the flange $a$ on top of the socket A, thereby holding the rubber firmly in place. The cap E is made very light and strong by the bead it forms above the rubber at $h$, and depends upon the flange $a$ to hold it in place, which is a much cheaper mode of construction than the screw-threads and rivets heretofore in use.

The bottom of the tubular socket A is made in the form of an inverted cone internally, this conical form extending about two inches, more or less, from the bottom upward, so as to obtain a gradual internal slope to the sides.

By this form, the butt of the whip, after passing through the rubber C, falls into the embrace of the inverted cone G so firmly that no motion of the carriage will move it from its seat. It will be seen that the slope must be carried up nearly one-half the length of the socket in order to accomplish the purpose, and if the slope should be carried up to the top of the socket, the slope of the sides would be so gradual that the whip would be apt to stick or wedge in and split the socket. This construction also obviates all rattle, and does away with the curled-hair and other cushions now put in the bottom of sockets to accomplish the same purpose.

The wood socket A, after being bored out, is turned down thin and light from the outside. A sheet-metal barrel, D, is then secured around it, reaching from the top finish to the bottom finish, completely incasing the main wood barrel of the socket, and thereby strengthening the same so it cannot split or be injured by any use for which it is intended. The fastenings may then be readily attached to the metal barrel D, and hold the socket firmly.

Having thus fully described my invention, what I claim as new, and desire to secure by Letters Patent, is—

1. The socket A, provided with an enlarged chamber, B, at its top, in combination with the diaphragm C and a suitable fastening-cap, E, substantially as set forth.

2. A whip-socket constructed with an internal cone-shaped bottom, in combination with a rubber diaphragm, substantially as and for the purpose set forth.

3. A wooden whip-socket provided with the metal barrel D, as and for the purpose set forth.

4. In combination with a whip-socket, jaws *b d*, screw *e*, and arm *f*, all constructed substantially as set forth.

In testimony that I claim the foregoing as my own I affix my signature in presence of two witnesses.

ANSON SEARLS.

Witnesses:
WM. M. COOK,
J. H. HOPPER.